US010359677B2

(12) United States Patent
Du et al.

(10) Patent No.: US 10,359,677 B2
(45) Date of Patent: Jul. 23, 2019

(54) LIQUID CRYSTAL DISPLAY PANEL AND METHOD FOR DRIVING THE SAME

(71) Applicant: Shenzhen China Star Optoelectronics Technology Co., Ltd., Shenzhen (CN)

(72) Inventors: Peng Du, Shenzhen (CN); Lixuan Chen, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 97 days.

(21) Appl. No.: 14/897,672

(22) PCT Filed: Oct. 14, 2015

(86) PCT No.: PCT/CN2015/091909
§ 371 (c)(1),
(2) Date: Dec. 12, 2017

(87) PCT Pub. No.: WO2017/049679
PCT Pub. Date: Mar. 30, 2017

(65) Prior Publication Data
US 2018/0157079 A1 Jun. 7, 2018

(30) Foreign Application Priority Data

Sep. 21, 2015 (CN) .......................... 2015 1 0605170

(51) Int. Cl.
*G02F 1/1368* (2006.01)
*G02F 1/1333* (2006.01)
(Continued)

(52) U.S. Cl.
CPC ...... *G02F 1/1368* (2013.01); *G02F 1/133345* (2013.01); *G02F 1/134309* (2013.01);
(Continued)

(58) Field of Classification Search
CPC ............. G02F 1/136286; G02F 1/1368; G02F 1/133512
(Continued)

(56) References Cited

U.S. PATENT DOCUMENTS

| 6,556,265 B1 * | 4/2003 | Murade ............ G02F 1/136213 349/111 |
| 2004/0239698 A1 | 12/2004 | Kamada et al. |

(Continued)

FOREIGN PATENT DOCUMENTS

| CN | 102749751 A | 10/2012 |
| CN | 103576400 A | 2/2014 |

(Continued)

OTHER PUBLICATIONS

Notification of Transmittal of the International Search Report and the Written Opinion of the International Searching Authority (Forms PCT/ISA/237, PCT/ISA/210, and PCT/ISA/220) dated Jun. 24, 2016, by the State Intellectual Property Office of People's Republic of China in corresponding International Application No. PCT/CN2015/091909. (12 pages).

Office Action dated Aug. 3, 2017 by the State Intellectual Property Office of People's Republic of China in corresponding Chinese Patent Application No. 201510605170.7. (5 pages).

*Primary Examiner* — Lucy P Chien

(57) ABSTRACT

Provided is an LTPS array substrate and a liquid crystal display panel, wherein the LTPS array substrate comprises: a first common electrode layer; a passivation layer, which is formed on the first common electrode layer, and has a first via hole formed therein; a pixel electrode layer, which is formed on the passivation layer; and a second common electrode layer, which is formed on the passivation layer, located between pixel electrodes corresponding to two adjacent sub-pixels in the pixel electrode layer, electrically isolated from the pixel electrode layer, and electrically connected to the first common electrode layer through the first via hole. The array substrate is capable of significantly (Continued)

enhancing the intensity of an electric field at an edge region of the adjacent sub-pixels, thereby increasing the transmittance at this region.

16 Claims, 4 Drawing Sheets

(51) Int. Cl.
  *G02F 1/1362* (2006.01)
  *G02F 1/1343* (2006.01)
(52) U.S. Cl.
  CPC .. *G02F 1/136209* (2013.01); *G02F 1/136227* (2013.01); *G02F 1/136286* (2013.01); *G02F 2001/134372* (2013.01); *G02F 2201/121* (2013.01); *G02F 2202/104* (2013.01)
(58) Field of Classification Search
  USPC .......................................................... 349/43
  See application file for complete search history.

(56) References Cited

U.S. PATENT DOCUMENTS

| | | | |
|---|---|---|---|
| 2007/0126969 A1* | 6/2007 | Kimura | G02F 1/134363 349/141 |
| 2009/0009458 A1 | 1/2009 | Bae et al. | |
| 2015/0325705 A1* | 11/2015 | Choi | G02F 1/134363 257/72 |
| 2016/0351153 A1 | 12/2016 | Huang et al. | |
| 2017/0140715 A1 | 5/2017 | Lien et al. | |
| 2017/0154587 A1 | 6/2017 | Chen et al. | |

FOREIGN PATENT DOCUMENTS

| | | |
|---|---|---|
| CN | 103777423 A | 5/2014 |
| CN | 104183221 A | 12/2014 |
| CN | 104795037 A | 7/2015 |
| CN | 104900203 A | 9/2015 |

* cited by examiner

LIQUID CRYSTAL DISPLAY PANEL AND METHOD FOR DRIVING THE SAME

CROSS-REFERENCE TO RELATED APPLICATIONS

The present application claims benefit of Chinese patent application CN 201510659235.6, entitled "An LTPS array substrate, and liquid crystal display panel" and filed on Oct. 14, 2015, the entirety of which is incorporated herein by reference.

FIELD OF THE INVENTION

The present disclosure relates to the field of liquid crystal display technologies, and in particular, to an LTPS array substrate, and a liquid crystal display panel.

BACKGROUND OF THE INVENTION

A Low Temperature Poly-Silicon (LTPS for short) thin film transistor liquid crystal display device (i.e., LTPS-TFT LCD), which is different from a conventional amorphous silicon thin film transistor liquid crystal display device, has the advantages of high resolution, fast response speed, high brightness, high aperture ratio, etc. Therefore, the LTPS-TFT LCD has been more and more widely used.

However, an array substrate of an existing LTPS-TFT LCD has such a problem that the transmittance at an edge position of adjacent sub-pixels is significantly lower than that at other positions, which deteriorates the display effect of the liquid crystal display panel.

In view of the above, there is an urgent need of an LTPS array substrate capable of ensuring the transmittance at the edge position of adjacent sub-pixels.

SUMMARY OF THE INVENTION

The technical problem to be solved by the present disclosure is to improve the transmittance at an edge region of adjacent sub-pixels in an LTPS array substrate. In order to solve the above technical problem, an LTPS array substrate is first provided in an embodiment of the present disclosure, comprising:
 a first common electrode layer;
 a passivation layer, which is formed on the first common electrode layer, and has a first via hole formed therein;
 a pixel electrode layer, which is formed on the passivation layer; and
 a second common electrode layer, which is formed on the passivation layer, located between pixel electrodes corresponding to two adjacent sub-pixels in the pixel electrode layer, electrically isolated from the pixel electrode layer, and electrically connected to the first common electrode layer through the first via hole.

According to one embodiment of the present disclosure, the array substrate further includes, at a data line position thereof:
 a transparent substrate;
 a first material layer, which is formed on the transparent substrate;
 a data line, which is formed on the first material layer; and
 a flat layer, which is formed on the data line and the first material layer,
 wherein the first common electrode layer is formed on the flat layer.

According to one embodiment of the present disclosure, the second common electrode layer is formed directly above the data line.

According to one embodiment of the present disclosure, the first material layer comprises:
 a light-shielding layer, which is formed on the transparent substrate; and
 a first insulation layer, which is formed on the transparent substrate and the light-shielding layer.

According to one embodiment of the present disclosure, the data line is formed on the first insulation layer and located directly above the light-shielding layer.

According to one embodiment of the present disclosure, the array substrate further includes, at a TFT switch position thereof:
 a transparent substrate;
 a light-shielding layer, which is formed on the transparent substrate;
 a second insulation layer, which is formed on the light-shielding layer and the transparent substrate;
 a polysilicon layer, which is formed on the second insulation layer and located directly above the light-shielding layer;
 a third insulation layer, which is formed on the polysilicon layer and the second insulation layer;
 a gate layer, which is formed on the third insulation layer and located directly above the light-shielding layer;
 a fourth insulation layer, which is formed on the gate layer and the third insulation layer;
 a source and drain layer, which is formed on the fourth insulation layer, and is electrically connected to the polysilicon layer through a second via hole formed in the third insulation layer and the fourth insulation layer; and
 a flat layer, which is formed on the source and drain layer and the fourth insulation layer,
 wherein the first common electrode layer is formed on the flat layer.

According to one embodiment of the present disclosure, the second common electrode layer is electrically connected to a common electrode corresponding to a first sub-pixel of the two adjacent sub-pixels through the first via hole.

According to one embodiment of the present disclosure, a pixel electrode corresponding to a second sub-pixel of the two adjacent sub-pixels is electrically connected to the source and drain layer through a third via hole formed in the passivation layer and the flat layer.

According to one embodiment of the present disclosure, the second common electrode layer is located on a same horizontal plane as the pixel electrode layer.

The present disclosure further provides a liquid crystal display panel, comprising:
 the LTPS array substrate as described in any one of the above embodiments;
 a color filter substrate; and
 a liquid crystal layer disposed between the LTPS array substrate and the color filter substrate.

According to the array substrate provided in the present disclosure, the via hole is used in bridging the common electrode out from the region of adjacent pixel electrodes, and the common electrode bridged out is located on a same horizontal plane as the pixel electrode. As a result, the intensity of the electric field in this region is significantly enhanced, and the transmittance in this region is improved. At the same time, with respect to a single sub-pixel, its total transmittance will be increased also.

In addition, in the edge region of the adjacent sub-pixels, since the common electrode and the pixel electrode are located in the same layer, there is no need of increasing the number of material layers.

Other features and advantages of the present disclosure will be further explained in the following description, and partly become self-evident therefrom, or be understood through implementation of the present disclosure. The objectives and other advantages of the present disclosure will be achieved through the structure specifically pointed out in the description, claims, and the accompanying drawings.

BRIEF DESCRIPTION OF THE DRAWINGS

In order to explain the technical solution of the embodiments of the present disclosure or the technical solution in the prior art in a clearer manner, the accompanying drawings used in illustrating the prior art or the embodiments of the present disclosure are briefly introduced as follows, in which.

DETAILED DESCRIPTION OF THE EMBODIMENTS

The present disclosure will be explained in detail with reference to the embodiments and the accompanying drawings in the following, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained therefrom all fall within the scope of the present disclosure.

Meanwhile, various specific details are expounded in the following to provide a thorough understanding of the embodiments of the present disclosure. However, it is obvious for a person skilled in the art that, the present disclosure can be implemented through other specific details or in other specific manners than those described herein.

Figure 1:
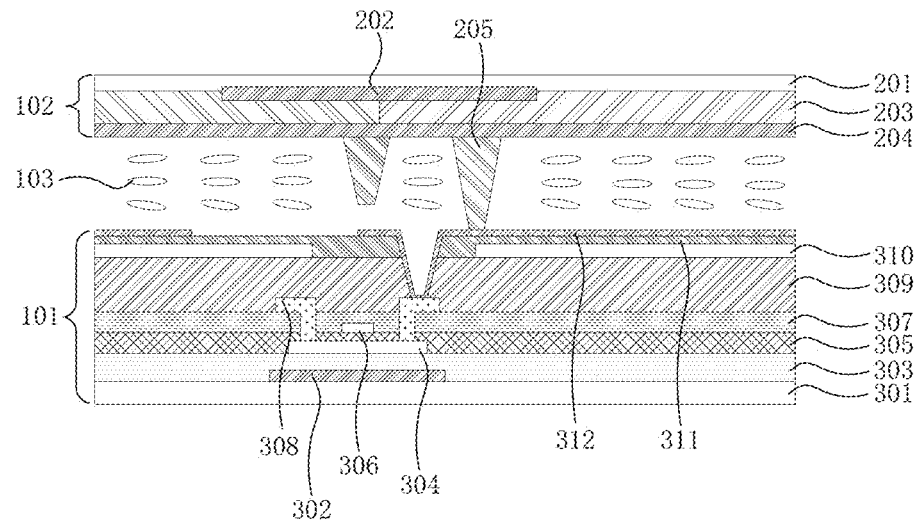
FIG. 1 schematically shows the structure of an existing LTPS liquid crystal display panel at a TFT switch position.

FIG. 1 schematically shows the structure of an existing LTPS liquid crystal display panel at a TFT switch position.

As can be seen from FIG. 1, the existing LTPS liquid crystal display panel, at the TFT switch position thereof, includes an array substrate 101, a color filter substrate 102, and a liquid crystal layer 103 filled between the array substrate 101 and the color filter substrate 102. The color filter substrate 102 therein includes a transparent substrate 201, a black matrix 202, a color resist layer 203, a flat layer 204, and a column spacer 205. Therein, the black matrix 202 is formed on the transparent substrate 201, and the color resist layer 203 covers the black matrix 202 and the transparent substrate 201. The black matrix 202 is located at the boundary of two adjacent sub-pixel units in the color resist layer 203. The flat layer 204 is formed on the color resist layer 203, and the column spacer 205 is formed on the flat layer 204. In the present embodiment, the column spacer 205 includes a main column spacer and an auxiliary column spacer for supporting the color filter substrate 102 when the liquid crystal display panel is being assembled.

At the TFT switch position of the array substrate 101, a light-shielding layer 302 is formed on the transparent substrate 301, and a second insulation layer 303 is formed on and cover the light-shielding layer 302 and the transparent substrate 301. An active layer (i.e., a polysilicon layer) 304 is formed on the second insulation layer 303 and located directly above the light-shielding layer 302. A third insulation layer 305 is formed on and cover the active layer 304 and the second insulation layer 303. A gate layer 306 is formed on the third insulation layer 305 and located directly above the polysilicon layer 304, such that an electrical isolation of the gate layer 306 from the polysilicon layer 304 is achieved via the third insulation layer 305.

A fourth insulation layer 307 is formed on the gate layer 306 and the third insulation layer 305, while a source and drain layer (i.e., an SD layer) 308 is formed on the fourth insulation layer 307. Therein, a second via hole is formed in the third insulation layer 305 and the fourth insulation layer 307, and the source and drain layer 308 is electrically connected to the polysilicon layer 304 through the second via hole.

A flat layer 309 is formed on the fourth insulation layer 307 and the source and drain layer 308, and a common electrode layer 310 is formed on the flat layer 309. As can be seen from FIG. 1, common electrodes in the common electrode layer 310 correspond to two adjacent sub-pixels respectively, and a certain interval is formed between the two common electrodes.

A passivation layer 311 is formed on the common electrode layer 310. Since the common electrode layer 310 does not completely cover the flat layer 309 at the TFT switch position of the array substrate 101, the passivation layer 311 also covers a portion of the flat layer 309, as shown in FIG. 1.

A pixel electrode layer 312 is formed on the passivation layer 311, and is electrically connected to the source and drain layer 308 through a third via hole formed in the passivation layer 311 and the flat layer 309.

Figure 2:
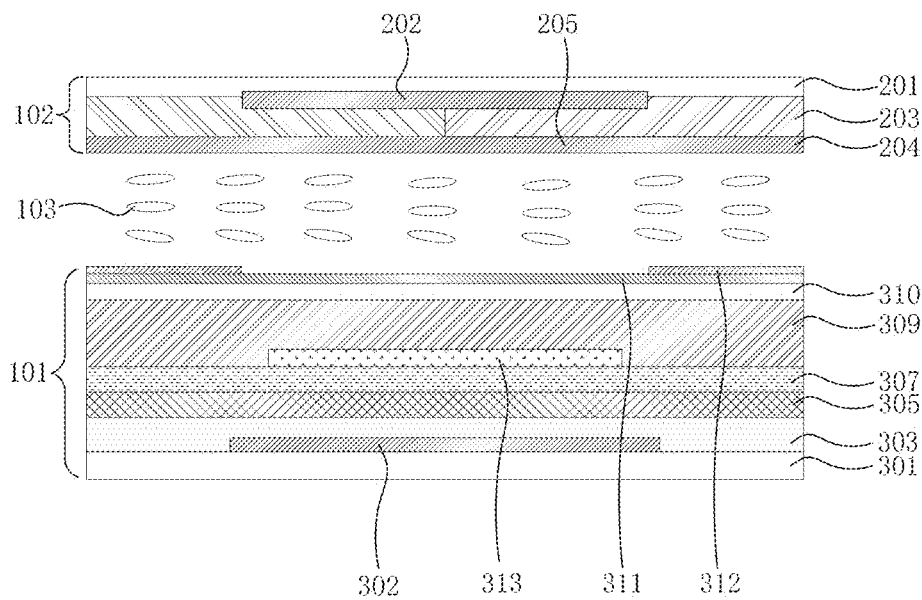
FIG. 2 schematically shows the structure of the existing LTPS liquid crystal display panel at a data line position.

FIG. 2 schematically shows the structure of existing LTPS liquid crystal display panel at a data line position.

As shown in FIG. 2, the existing LTPS liquid crystal display panel also includes, at the data line position thereof, an array substrate 101, a color filter substrate 102, and a liquid crystal layer 103 filled between the array substrate 101 and the color filter substrate 102. Therein, as the structures of the color filter substrate and the liquid crystal layer are respectively the same as those of the color filter substrate and the liquid crystal layer shown in FIG. 1, they will not be described herein for the sake of simplicity. In the following, only the structure of the array substrate 101 at the data line position will be further explained.

A first material layer is formed on a transparent substrate 301 at the data line position of the array substrate 101, wherein the first material layer includes a light-shielding layer 302 and a first insulation layer. Specifically, in the present embodiment, the first insulation layer is formed by a plurality of stacked insulation layers. As shown in FIG. 2, the first insulation layer further includes sequentially stacked second insulation layer 303, third insulation layer 305, and fourth insulation layer 307.

A data line 313 is formed on the fourth insulation layer 307 and located directly above the light-shielding layer 302. A flat layer 309 is formed on the data line 313 and the fourth insulation layer 307. A common electrode layer 310 is formed between a passivation layer 311 and a flat layer 309, and a pixel electrode layer 312 is formed on the passivation layer 311.

Figure 3:
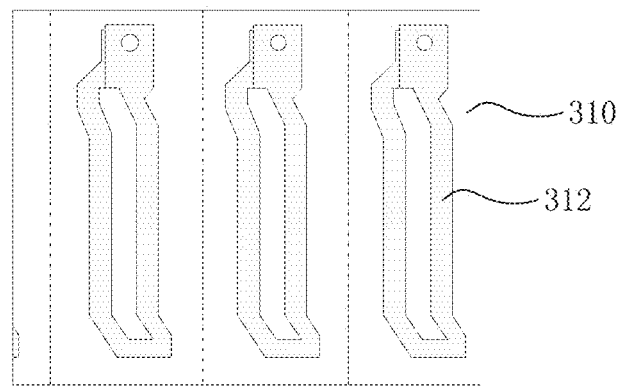
FIG. 3 is a planar diagram of a sub-pixel in the existing LTPS liquid crystal display panel.

At the same time, in view of a planar diagram of a sub-pixel in the existing LTPS liquid crystal display panel as shown in FIG. 3, it can be seen that an existing LTPS liquid crystal display panel array substrate mainly depends on an upper layer and a lower layer of ITO electrodes (i.e., pixel electrodes and common electrodes) to form an edge electric field, which drives liquid crystals to rotate in a plane, thereby controlling the rotation direction of light.

As the LTPS has the advantage of high mobility, when a pixel is designed, the TFT switch can be designed with small geometric dimension, which is beneficial for achievement of a higher PPI product design. However, with respect to the existing LTPS liquid crystal display panel, since an electric field between the two layers of electrodes (i.e., the pixel electrodes and the common electrodes) passes through an intermediate passivation layer, which consumes intensity of the electric field itself, the intensity of the electric field is significantly weakened at an edge region of adjacent sub-pixels. This will also lead to a decrease in the transmittance of this region (i.e., the edge region of adjacent sub-pixels).

The present disclosure provides a new LTPS array substrate and an LTPS liquid crystal display panel in view of the above problems of the existing LTPS liquid crystal display panel. With respect to the existing LTPS liquid crystal display panel, in order to ensure non-appearance of a color mixing phenomenon between adjacent sub-pixels, pixel electrodes corresponding to the adjacent sub-pixels should be spaced at a certain interval (for example, about 10 µm). In the LTPS array substrate provided in the present disclosure, however, a via hole is used in bridging a common electrode out from an interval region between adjacent sub-pixels, and an additional common electrode layer is formed at a position of same horizontal plane as the pixel electrode layer, thereby effectively increasing intensity of the electric field at the edge region of the adjacent sub-pixels, and improving the transmittance of the array substrate at this region.

Figure 4:
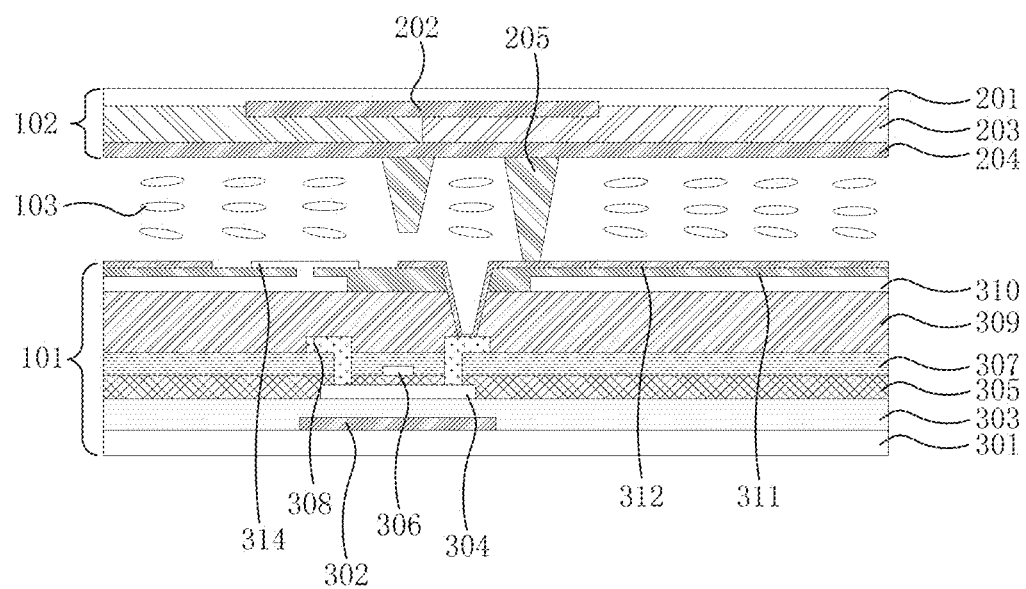
FIG. 4 schematically shows the structure of an LTPS liquid crystal display panel at a TFT switch position according to one embodiment of the present disclosure.

FIG. 4 schematically shows the structure of the liquid crystal display panel at the TFT switch position according to the embodiment of the present disclosure.

By comparison between FIG. 1 and FIG. 4, it can be seen that the LTPS liquid crystal display panel provided in this embodiment is substantially the same in structure as the LTPS liquid crystal display panel shown in FIG. 1. For the sake of simplicity and more explicit explanation of the purposes, principles, and advantages of the present disclosure, only differences therebetween will be described in detail in the following.

As shown in FIG. 4, compared with the LTPS liquid crystal display panel shown in FIG. 1, a second common electrode layer 314 is further provided in the array substrate 101 of the liquid crystal display panel provided in the present embodiment, in addition to the common electrode layer (i.e., the first common electrode layer) 310 provided between the passivation layer 311 and the flat layer 309. The second common electrode layer 314 is formed on the passivation layer 311, and is located between pixel electrodes corresponding to two adjacent sub-pixels in the pixel electrode layer 312, i.e., in a same material layer as the pixel electrode layer 312. Therein, predetermined intervals are maintained between the second common electrode layer 314 and pixel electrodes in the pixel electrode layer 312, so as to ensure electrical isolation between the second common electrode layer 314 and the pixel electrodes in the pixel electrode layer 312.

In the present embodiment, the second common electrode layer 314 is electrically connected to the first common electrode layer 310 through a first via hole formed in the passivation layer 311. Specifically, as shown in FIG. 4, the second common electrode layer 314 is electrically connected to a common electrode corresponding to a first sub-pixel of the two adjacent sub-pixels through the first via hole. And a pixel electrode corresponding to a second sub-pixel in the two adjacent sub-pixels is electrically connected to the source and drain layer 308 through the third via hole formed in the passivation layer 311 and the flat layer 309.

In this embodiment, the second common electrode layer 314 is preferably located on a same horizontal plane as the pixel electrode layer 312. Of course, in other embodiments of the present disclosure, the second common electrode layer 314 may also not be on the same horizontal plane as the pixel electrode layer 312, depending on actual requirements or limitations or requirements of a manufacturing procedure. The present disclosure is not limited thereto.

Figure 5:
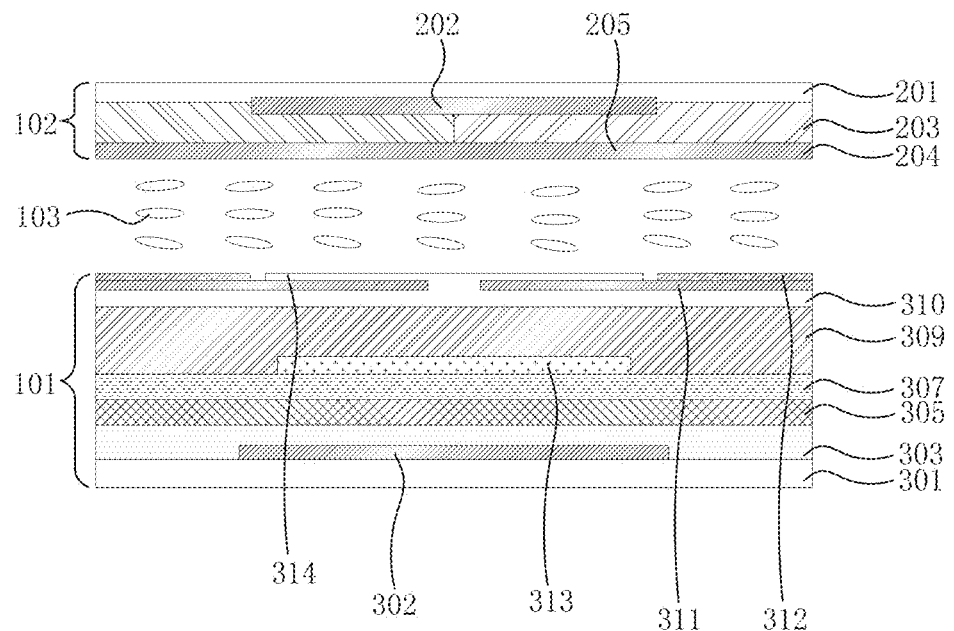
FIG. 5 schematically shows the structure of the LTPS liquid crystal display panel at a data line position according to one embodiment of the present disclosure.

FIG. 5 schematically shows the structure of the LTPS liquid crystal display panel at the data line position according to the embodiment of the present disclosure.

By comparison between FIGS. 2 and 5, it can be discerned that, the LTPS liquid crystal display panel provided in this embodiment is substantially the same in structure as the LTPS liquid crystal display panel shown in FIG. 2 at the data line position. For the sake of simplicity and more explicit explanation of the purposes, principles, and advantages of the present disclosure, only differences therebetween will be described in detail in the following.

Figure 6:
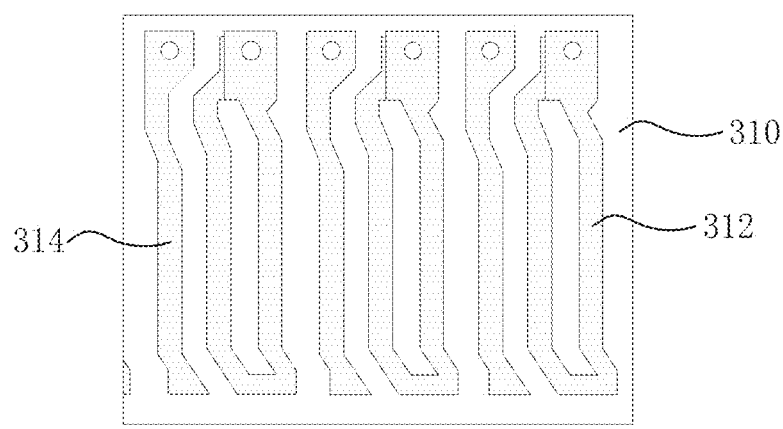
FIG. 6 is a planar diagram of a sub-pixel in the LTPS liquid crystal display panel according to one embodiment of the present disclosure.

As shown in FIG. 5, compared with the LTPS liquid crystal display panel shown in FIG. 2, a second common electrode layer 314 is further provided in the array substrate 101 of the liquid crystal display panel provided in the present embodiment, in addition to the common electrode layer (i.e., the first common electrode layer) 310 provided between the passivation layer 311 and the flat layer 309. As is the case with the second common electrode at the TFT switch position, the second common electrode layer 314 at the data line position is also formed between the pixel electrodes corresponding to two adjacent sub-pixels in the pixel electrode layer 312, and located in the same material layer as the pixel electrode layer 312. Therein, as can be seen in view of a planar diagram of a sub-pixel in the LTPS liquid crystal display panel as shown in FIG. 6, predetermined intervals are maintained between the second common electrode layer 314 and pixel electrodes in the pixel electrode layer 312, so as to ensure electrical isolation between the second common electrode layer 314 and the pixel electrodes in the pixel electrode layer 312.

In the present embodiment, the second common electrode layer 314 is electrically connected to the first common electrode layer 310 through the first via hole formed in the passivation layer 311. Also, at the data line position in the liquid crystal display panel provided by the present embodiment, the second common electrode layer 314 is preferably located on the same horizontal plane as the pixel electrode layer 312. Of course, in other embodiments of the present disclosure, the second common electrode layer 314 may also not be on the same horizontal plane as the pixel electrode layer 312, depending on the actual requirements or the manufacturing procedure. The present disclosure is not limited thereto.

It should be noted that, in the LTPS array substrate and the LTPS liquid crystal display panel provided in the present embodiment, each insulation layer is realized by means of a silicon oxynitride layer. Of course, in other embodiments of the present disclosure, other reasonable materials may be used for the constituent materials of respective material layers. The present disclosure is not limited thereto.

As can be seen from the above description, according to the array substrate provided in this embodiment, the via hole is used in bridging the common electrode out from the region of the adjacent pixel electrodes, and the common electrode bridged out is located on the same horizontal plane as the pixel electrode. As a result, the intensity of the electric field in this region is significantly enhanced, and the transmittance of the array substrate in this region is improved. At the same time, with respect to a single sub-pixel, its total transmittance will be increased also.

In addition, in this region, since the common electrode and the pixel electrode are located in the same layer, there is no need of increasing the number of material layers.

Figure 7:
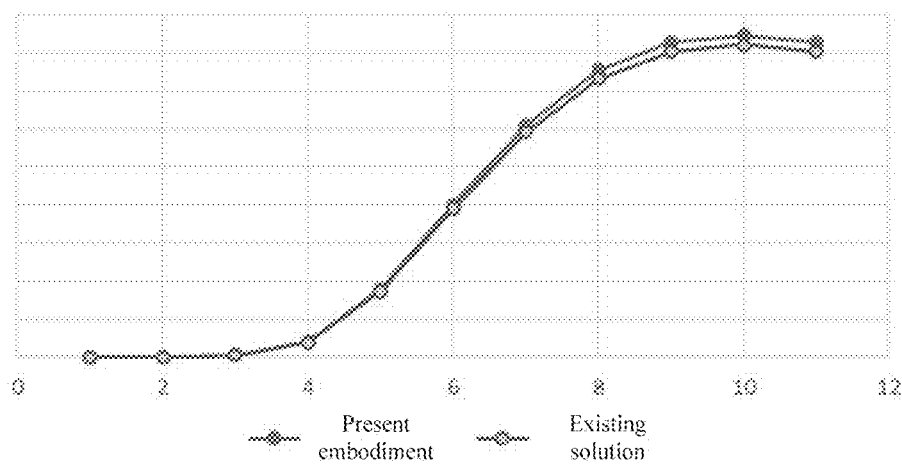
FIG. 7 is a comparison diagram between the transmittance of the LTPS liquid crystal display panel provided in the present disclosure and that of the existing LTPS liquid crystal display panel.

In order to show the advantages of the array substrate provided by the present embodiment more clearly, the transmittance of the LTPS array substrate provided in the present embodiment is compared with that of the existing LTPS array substrate. FIG. 7 is a comparison diagram of transmittance between the two kinds of array substrates. As can be seen from FIG. 7, the transmittance of the array substrate provided by the present embodiment is remarkably improved as compared with that of the existing LTPS array substrate.

It could be understood that, the embodiments disclosed herein are not limited by the specific structures or materials disclosed herein, but incorporate the equivalent substitutes of these features which are comprehensible to those skilled in the art. It should be also understood that, the terms used herein are used for describing the specific embodiments, not for limiting them.

The phrases "one embodiment" or "embodiments" referred to herein mean that the descriptions of specific features, structures, and characteristics in combination with the embodiments are included in at least one embodiment of the present disclosure. Therefore, the phrases "one embodiment" or "embodiments" that have appeared in different parts of the whole description do not necessarily refer to the same embodiment.

The embodiments are described hereinabove to interpret the principles of the present disclosure in one application or a plurality of applications. However, a person skilled in the art, without departing from the principles and thoughts of the present disclosure, can make various modifications to the forms, usages and details of the embodiments of the present disclosure without any creative work. Therefore, the protection scope of the present disclosure shall be determined by the claims.

The invention claimed is:

1. An LTPS array substrate, comprising:
   a first common electrode layer;
   a passivation layer, which is formed on the first common electrode layer, and has a first via hole formed therein;
   a pixel electrode layer, which is formed on the passivation layer; and
   a second common electrode layer, which is formed on the passivation layer, located between pixel electrodes corresponding to two adjacent sub-pixels in the pixel electrode layer, electrically isolated from the pixel electrode layer, and electrically connected to the first common electrode layer through the first via hole;
   wherein the array substrate further includes, at a TFT switch position thereof:
   a transparent substrate;
   a light-shielding layer, which is formed on the transparent substrate;
   a second insulation layer, which is formed on the light-shielding layer and the transparent substrate;
   a polysilicon layer, which is formed on the second insulation layer and located directly above the light-shielding layer;
   a third insulation layer, which is formed on the polysilicon layer and the second insulation layer;
   a gate layer, which is formed on the third insulation layer and located directly above the light-shielding layer;
   a fourth insulation layer, which is formed on the gate layer and the third insulation layer;
   a source and drain layer, which is formed on the fourth insulation layer, and is electrically connected to the polysilicon layer through a second via hole formed in the third insulation layer and the fourth insulation layer; and
   a flat layer, which is formed on the source and drain layer and the fourth insulation layer,
   wherein the first common electrode layer is formed on the flat layer.

2. The LTPS array substrate according to claim 1, wherein the array substrate further includes, at a data line position thereof:
   a transparent substrate;
   a first material layer, which is formed on the transparent substrate;
   a data line, which is formed on the first material layer; and
   a flat layer, which is formed on the data line and the first material layer,
   wherein the first common electrode layer is formed on the flat layer.

3. The LTPS array substrate according to claim 2, wherein the second common electrode layer is formed directly above the data line.

4. The LTPS array substrate according to claim 2, wherein the first material layer comprises:
   a light-shielding layer, which is formed on the transparent substrate; and
   a first insulation layer, which is formed on the transparent substrate and the light-shielding layer.

5. The LTPS array substrate according to claim 4, wherein the data line is formed on the first insulation layer and located directly above the light-shielding layer.

6. The LTPS array substrate according to claim 1, wherein the second common electrode layer is electrically connected to a common electrode corresponding to a first sub-pixel of the two adjacent sub-pixels through the first via hole.

7. The LTPS array substrate according to claim 6, wherein a pixel electrode corresponding to a second sub-pixel of the two adjacent sub-pixels is electrically connected to the source and drain layer through a third via hole formed in the passivation layer and the flat layer.

8. The LTPS array substrate according to claim 1, wherein the second common electrode layer is located on a same horizontal plane as the pixel electrode layer.

9. A liquid crystal display panel, comprising:
an LTPS array substrate;
a color filter substrate; and
a liquid crystal layer disposed between the LTPS array substrate and the color filter substrate,
wherein the LTPS array substrate includes:
  a first common electrode layer;
  a passivation layer, which is formed on the first common electrode layer, and has a first via hole formed therein;
  a pixel electrode layer, which is formed on the passivation layer; and
  a second common electrode layer, which is formed on the passivation layer, located between pixel electrodes corresponding to two adjacent sub-pixels in the pixel electrode layer, electrically isolated from the pixel electrode layer, and electrically connected to the first common electrode layer through the first via hole;
wherein the array substrate further includes, at a TFT switch position thereof:
a transparent substrate;
a light-shielding layer, which is formed on the transparent substrate;
a second insulation layer, which is formed on the light-shielding layer and the transparent substrate;
a polysilicon layer, which is formed on the second insulation layer and located directly above the light-shielding layer;
a third insulation layer, which is formed on the polysilicon layer and the second insulation layer;
a gate layer, which is formed on the third insulation layer and located directly above the light-shielding layer;
a fourth insulation layer, which is formed on the gate layer and the third insulation layer;
a source and drain layer, which is formed on the fourth insulation layer, and is electrically connected to the polysilicon layer through a second via hole formed in the third insulation layer and the fourth insulation layer; and
a flat layer, which is formed on the source and drain layer and the fourth insulation layer, wherein the first common electrode layer is formed on the flat layer.

10. The liquid crystal display panel according to claim 9, wherein the array substrate further includes, at a data line position thereof:
a transparent substrate;
a first material layer, which is formed on the transparent substrate;
a data line, which is formed on the first material layer; and
a flat layer, which is formed on the data line and the first material layer,
wherein the first common electrode layer is formed on the flat layer.

11. The liquid crystal display panel according to claim 10, wherein the second common electrode layer is formed directly above the data line.

12. The liquid crystal display panel according to claim 10, wherein the first material layer comprises:
a light-shielding layer, which is formed on the transparent substrate; and
a first insulation layer, which is formed on the transparent substrate and the light-shielding layer.

13. The liquid crystal display panel according to claim 12, wherein the data line is formed on the first insulation layer and located directly above the light-shielding layer.

14. The liquid crystal display panel according to claim 9, wherein the second common electrode layer is electrically connected to a common electrode corresponding to a first sub-pixel of the two adjacent sub-pixels through the first via hole.

15. The liquid crystal display panel according to claim 14, wherein a pixel electrode corresponding to a second sub-pixel of the two adjacent sub-pixels is electrically connected to the source and drain layer through a third via hole formed in the passivation layer and the flat layer.

16. The liquid crystal display panel according to claim 9, wherein the second common electrode layer is located on a same horizontal plane as the pixel electrode layer.

* * * * *